US008303044B2

(12) United States Patent
Obermeyer

(10) Patent No.: US 8,303,044 B2
(45) Date of Patent: Nov. 6, 2012

(54) DUMPING VEHICLE

(76) Inventor: James H. Obermeyer, Crown Point, IN (US)

( * ) Notice: Subject to any disclaimer, the term of this patent is extended or adjusted under 35 U.S.C. 154(b) by 280 days.

(21) Appl. No.: 12/730,304

(22) Filed: Mar. 24, 2010

(65) Prior Publication Data
US 2011/0233986 A1    Sep. 29, 2011

(51) Int. Cl.
  *B60P 1/16*    (2006.01)
(52) U.S. Cl. .................................. 298/22 R
(58) Field of Classification Search ........... 298/17.5, 298/19 R, 22 R, 22 AE, 22 J, 22 P, 22 D
  See application file for complete search history.

(56) References Cited

U.S. PATENT DOCUMENTS

| 2,775,480 | A |   | 12/1956 | Braswell et al. |
| 2,861,837 | A |   | 11/1958 | Morse |
| 2,988,399 | A |   | 6/1961 | Wood |
| 3,044,832 | A | * | 7/1962 | McManus .................. 298/20 A |
| 3,336,080 | A | * | 8/1967 | Heck et al. ................. 298/17.5 |
| 3,459,451 | A |   | 8/1969 | Hoy |
| 4,076,301 | A |   | 2/1978 | Gergoe |
| 4,216,996 | A |   | 8/1980 | Pitts |
| 4,307,541 | A |   | 12/1981 | Farmer et al. |
| 4,382,632 | A |   | 5/1983 | Pitts |
| 4,941,581 | A |   | 7/1990 | Searles et al. |
| 4,954,039 | A |   | 9/1990 | Johnston et al. |
| 5,184,872 | A | * | 2/1993 | Larochelle et al. ....... 298/22 AE |
| 5,454,620 | A |   | 10/1995 | Hill et al. |
| 5,509,724 | A |   | 4/1996 | Perry et al. |
| 5,513,901 | A | * | 5/1996 | Smith et al. ............... 298/22 J |
| 5,758,927 | A | * | 6/1998 | Koester .................... 298/22 AE |
| 6,412,877 | B1 |  | 7/2002 | Faison |
| 6,505,891 | B1 |  | 1/2003 | Hickey |
| 6,764,130 | B1 |  | 7/2004 | Hull |
| 6,779,825 | B1 |  | 8/2004 | Greenert et al. |
| 6,880,894 | B2 |  | 4/2005 | Obermeyer |
| 6,880,895 | B1 |  | 4/2005 | Brown et al. |
| 6,890,003 | B2 |  | 5/2005 | Adams |
| 7,093,876 | B2 |  | 8/2006 | Romig et al. |
| 7,118,153 | B2 |  | 10/2006 | Kitayama et al. |
| 7,150,486 | B2 |  | 12/2006 | Ichinose |
| 2003/0011234 | A1 | | 1/2003 | Hickey et al. |
| 2006/0006676 | A1 | | 1/2006 | Plett et al. |

FOREIGN PATENT DOCUMENTS

GB       1199274       7/1970

* cited by examiner

*Primary Examiner* — H Gutman
(74) *Attorney, Agent, or Firm* — Woodard, Emhardt, Moriarty, McNett & Henry LLP

(57) ABSTRACT

A dumping vehicle with a dump bed for holding and dumping material is disclosed. Embodiments include a coupler for coupling the dump bed with a tractor and a linkage connecting the dump bed and coupler, the linkage maintaining the orientation of the coupler steady during dumping. Embodiments include a linkage, dump bed and coupler forming a quadrilateral that deforms during dumping. The linkage can include two arms of different lengths, each pivotally connected to the dump bed and the coupler. In alternate embodiments, the dump bed and a rear support connect at a physical pivot location and the dump bed rotates about a location that is different from the physical pivot location and can rotate about a location that moves. The hinge assembly can include two hinge arms of different lengths that move the dump bed sill rearward and upward as the forward end of the dump bed is raised.

16 Claims, 10 Drawing Sheets

DUMPING VEHICLE

FIELD

Embodiments of the present invention generally relate to dumping vehicles, for example dump trucks and dump trailers.

BACKGROUND

Dumping vehicles, for example dump trucks and dump trailers, are frequently used as a convenient way to transport material and deposit the transported material at a destination. Dump trucks generally include a single frame attached to an engine that moves the vehicle and a dump bed that carries and deposits a payload of material. A dump trailer generally couples to a tractor with an engine, which moves the trailer from one destination to another over, for example, a roadway. Frequently, the front portion of a dump trailer is supported by the tractor and the rear portion is supported by the trailer's frame and wheels.

A dump trailer generally includes a payload-carrying dump bed that tilts to empty the dump bed and deposit the payload at the destination. One type of dump trailer is an end dump trailer that, when tilted, dumps its contents out of the back end of the dump trailer as the forward end of the payload body is rotated upward. Side dump trailers unload the contents of their payload carrying bodies off to one side of the trailer.

A dump trailer typically includes a coupler, which couples with a complimentary coupler located on the tractor. One type of coupling includes a downwardly extending pin attached to the front of the trailer that mates with a complimentary receptacle on the tractor. Fifth-wheel couplings are one example. Typically, the receptacle on the tractor is at least partially surrounded by a coupling plate with a front end that is allowed to freely tilt up and down about a horizontal axis, for example axis 56 in FIG. 1. Some tractor couplers include a mechanism that can be locked with a pin to inhibit the tractor coupler from tilting.

An example schematic of a tractor 50 is depicted in FIG. 1. Tractor 50 includes a coupler 52 that pivots about pin 54. Pin 54 defines a horizontal axis 56 about which coupler 52 rotates (tilts). To connect the trailer to the tractor, the driver typically backs the tractor under the trailer and the downwardly extending pin slides along the tractor coupling plate until it mates with the pin receptacle. The tractor coupling plate usually includes a latching mechanism that holds the trailer pin in the tractor's pin receptacle. The coupling between the tractor and the trailer allow the tractor and trailer to pivot with respect to one another about a vertical axis and allows the tractor-trailer combination to maneuver and turn while being driven over, for example, a roadway. Typically the coupler on the tractor can pivot along a horizontal axis to accommodate the flexing of the tractor-trailer rig as it travels over high and low points in the roadways, such as crests and valleys in the pavement.

Dumping vehicles are used to transport material from one location to another. The forward end of the dump trailer is raised to deposit the payload material at the destination, and frequently into a receiving container. In typical paving operations, raw asphalt material is transported in a dumping vehicle, such as a dump truck or dump trailer, and is then dumped or pushed into a hopper adjacent the rear of the truck. The hopper then feeds the material to the paving equipment which lays the material as asphalt paving. When involved with this type of operation, it is preferred that the paving material be dumped directly from the dumping vehicle into the hopper without spilling material onto the surrounding area.

To accommodate this operation, typically an asphalt hopper is positioned very close to the rear of the dump trailer with the front edge of the hopper underneath the trailer's sill. Spacer wheels can be placed on the hopper which abuts the trailer's rear wheels to provide the correct spacing. Prior trailers have allowed the trailer sill to overlap the hopper by having the rear wheels of the trailer offset inward approximately 12 inches or more from the rear edge of the trailer.

SUMMARY

Embodiments of the present invention provide an improved dumping vehicle, such as an improved dump trailer adapted to couple with a tractor.

When unloading the payload material from a dump trailer connected to a tractor with, for example, a fifth-wheel coupling, forces exerted on the coupling can cause the coupling to move, which can exacerbate an already unstable situation with the dump bed raised into the dumping position. For example, when using a fifth-wheel coupling, the forces exerted on the tractor's coupling plate will frequently cause the tractor's coupling plate to tilt about its horizontal pivot axis, which is oriented roughly parallel to the ground. The tilting of the tractor's coupling plate will shift the trailer's coupler, which is connected to the tractor's coupling plate. The shifting of the trailer's coupler further destabilizes the trailer. In addressing this problem, others have included a locking pin with the tractor's fifth-wheel coupling to limit the amount the coupling plate tilts while dumping. However, an extra step is required for the driver to lock the coupling plate, which generally requires the driver to exit the tractor cab and insert the pin into the coupling plate mechanism. Alternately, damage can occur if the driver does not remember to remove the pin before driving the tractor and trailer rig over a crest (hill) or valley in the pavement. As such, this extra step of inserting the pin is frequently not performed, either because the driver forgets or because the driver is in too much of a hurry.

In order to empty a dump bed of a payload, the dump bed must be sufficiently tilted to cause the contents to slide out the lower end of the dump bed. In order to sufficiently raise the upper end of the dump bed, sometimes multi-staged lift cylinders with at least one piston rod also acting as a piston barrel (also referred to as telescopic lift cylinders), which are capable of extending to greater than twice their collapsed length, have been used. However, multi-staged lift cylinders generally provide less lateral stability when extending, which can lead to unstable situations with the dump bed in the raised position. One potential reason for the instability of the multi-staged lift cylinders is that the multi-staged lift cylinders include short guide glands (the portion of the hydraulic cylinder adapted to seal around the movable piston rod) that are relatively susceptible to damage with the application of lateral forces. Further, multi-staged lift cylinders are often attached to the tractor with a connection that allows the multi-staged cylinder to tilt in order to minimize the lateral forces exerted on the multi-staged cylinder.

Single-stage cylinders include longer guide glands that are less susceptible to damage under lateral loading and can be attached to the tractor in a manner that resists lateral loads. Furthermore, the seals in a hydraulic cylinder guide gland are typically flexible. As such, hydraulic cylinders with higher numbers of guide glands along their length while extended, such as multi-stage cylinders, are more flexible along their length than cylinders with a single guide gland along its length, such as a single-staged cylinder. Moreover, guide glands typically leak fluid during use, and using multiple guide glands will result in a greater amount of hydraulic fluid leaking than if a single guide gland is used.

Frequently dump vehicles are used to deposit the contents of the dump bed into a receptacle with vertically-extending sidewalls, such as an asphalt hopper. Some dump vehicles include rear wheels that are offset from the rear end of the dump bed to accommodate a hopper. Nevertheless, even with the rear wheels offset from the rear end of the dump bed, the rotation of the rear end of the dump bed can still impact and damage the upwardly-extending walls of the hoppers, especially if the hopper is not properly positioned, which tends to occur as workers fatigue throughout the day. Federal regulations require, for safety reasons, that trucks having rear wheels set more than 12 inches from the rear edge of the trailer include rear, shock absorbing bumpers mounted to the rear of the trailer to prevent smaller vehicles from traveling under the trailer in a collision. While desirable from a safety aspect, this also prevents a hopper, such as an asphalt hopper, from being positioned sufficiently far forward from the trailer sill to prevent damage. To compensate for this problem, paving companies are sometimes rebuilding older trailers or some manufactures have proposed folding or collapsible bumpers which are deployed during normal driving and stored during dumping. However, in practice, collapsible bumpers have been unwieldy, expensive and have caused customer complaints.

An alternate solution to help prevent contact between the dump bed and the hopper while dumping into the hopper is to connect a spill guard to the rear edge of the dump trailer thereby extending the length of the trailer. However, this solution violates the federal requirements and is, therefore, unsatisfactory. Still another alternative to help prevent contact between a dump bed and a hopper while dumping into the hopper is to use a straight trailer, which is not yet subject to the same requirements, but this entails the disadvantage of a smaller load as compared to a dump trailer. Accordingly, there is a need for an improved dump trailer which provides sufficient load capacity and the ability to efficiently transfer paving material from the trailer to the hopper without waste and/or damage, and which complies with federal safety regulations.

Furthermore, to compensate for the potential interference that can occur between the rear end of the dump bed and the front panel of the hopper, many operators have removed the upper portion of the hopper's front panel to provide clearance, but which simultaneously reduces the hopper's capacity. Accordingly, there is a need for a design in which the front panel of the hopper does not need to be reduced in size.

Still further, governmental regulations require mud flaps on dumping vehicles. However, the manner in which the lower end of the dump bed moves while the dump bed is tilted can damage the dump vehicle's mud flap brackets and/or mud flaps. In response, various complex and expensive mud flap brackets have been designed to help accommodate the movement of the dump bed without damaging the mud flap bracket and/or mud flap. However, problems still exist with these complex and/or expensive mud flap brackets. Accordingly, there is a need for a design in which complex and/or mud flap brackets are not required.

As such, there is a need for improved dumping vehicles. Embodiments of the present invention address these and other concerns, and provide other important advantages.

For example, one embodiment of the present invention includes a dump trailer with a dump bed and a coupler connected by a connecting linkage that maintains the coupler steady as the dump bed is raised and/or lowered. The connecting linkage includes two link arms that are pivotally connected to the coupler and the dump bed. The locations at which the link arms pivotally connect to the dump bed and the coupler form a quadrilateral polygon that deforms as the dump bed tilts.

As another example, embodiments of the present invention include a rear hinge assembly connecting the rear end of the dump bed with a rear support that holds the rear end of the dump bed above a support surface. As the forward end of the dump bed is raised, the rear hinge mechanism moves the rearmost portion of the dump bed (the dump bed sill) rearward extending the dump bed sill beyond the end of the rear support as the forward end of the dump bed is raised. The rear hinge mechanism can also cause the dump bed sill to at least initially move upward as the forward end of the dump bed is raised.

As another example, alternate embodiments include a rear hinge mechanism pivotally connected to at least one of the dump bed and the rear support where the rear hinge mechanism results in the dump bed rotating around a point that is different from the physical pivot location as the forward end of the dump bed is either raised or lowered. In certain embodiments, the rear hinge mechanism results in the dump bed rotating around a point that moves as the forward end of the dump bed is raised or lowered.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein.

DETAILED DESCRIPTION OF THE ILLUSTRATED EMBODIMENTS

Figure 1:
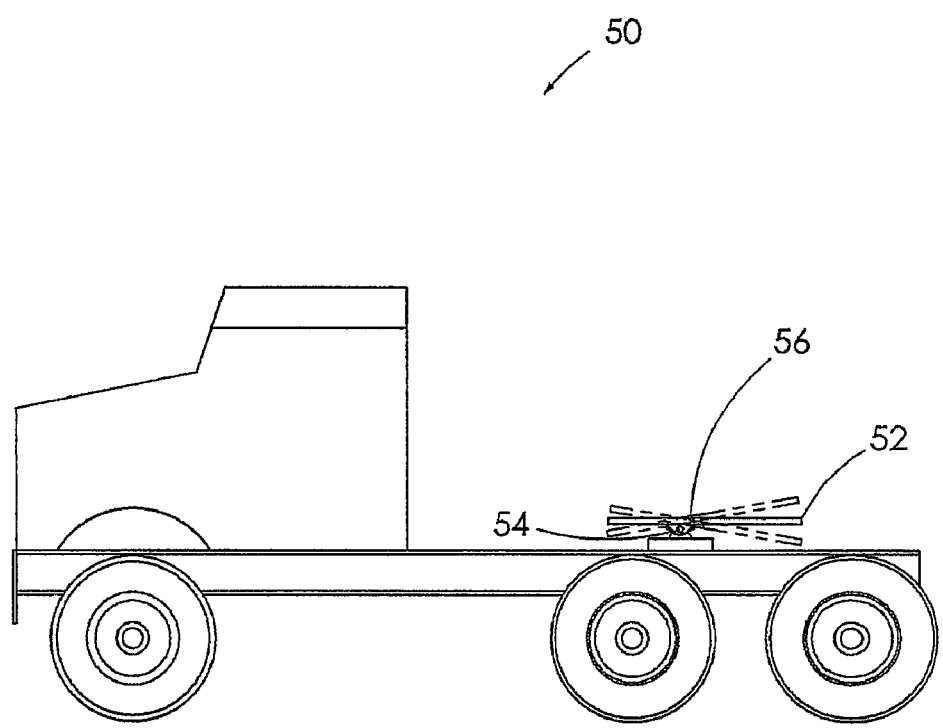
FIG. 1 is a schematic side elevational view of a tractor with a coupler.

For the purposes of promoting an understanding of the principles of the invention, reference will now be made to the selected embodiments illustrated in the drawings and specific language will be used to describe the same. It will nevertheless be understood that no limitation of the scope of the invention is hereby intended, such alterations, modifications, and further applications of the principles of the invention being contemplated as would normally occur to one skilled in the art to which the invention relates. At least one embodiment of the invention is shown in great detail, although it will be apparent to those skilled in the relevant art that some features or some combinations of features may not be shown for the sake of clarity.

Depicted in FIGS. 2-5 is a dumping vehicle, for example quarter-frame rear dump trailer 100, which may also be referred to as a semi-frame dump trailer, according to one embodiment of the present invention. Dump trailer 100 includes a payload-carrying body, for example, dump bed 110, which includes a forward end 112 and a rearward end 114. Attached to rearward end 114 is door 116, which prevents the payload from exiting the rearward end 114 of dump bed 110 when door 116 is latched.

Dump trailer 100 also includes a coupler 120, which connects with coupler 52 of tractor 50. A stabilizing connecting linkage, including for example connecting arms or links 150 and 152, connect dump bed 110 to coupler 120. Dump trailer 100 further includes lifting members, for example, hydraulic lift cylinders 130 to tilt the forward end 112 of dump bed 110 upward. As lift cylinders 130 tilt the forward end 112 of dump bed 110 upward and tractor 50 holds coupler 120 at a constant height above the support surface (for example support surface 190 depicted in FIG. 3), the stabilizing connecting links 150 and 152 maintain coupler 120 in a steady orientation with respect to the support surface.

In the illustrated embodiment, coupler 120 includes a downwardly-extending pin 122 and a coupler plate 124 which is rigidly connected to a horizontal member 126. Pin 122 connects with a complimentary receptacle in coupler 52 of tractor 50. The pivotable connection between dump trailer coupler 120 and tractor coupler 52 defines a vertical pivot axis 132 about which tractor 50 and dump trailer 100 pivot as tractor 50 changes direction while being steered across a surface, for example a roadway.

Support legs 128 are connected to and extend downward from coupler 120. The bottom portion of support legs 128 are adapted to contact the support surface and hold coupler 120 above the support surface when tractor 50 is not connected to dump trailer 100.

The forward end of forward connecting arm or link 150 is pivotally connected to the forward end of coupler 120 and the rearward end of connecting link 150 is pivotally connected to dump bed 110. The forward end of rear connecting link 152 is pivotally connected to the rear end of coupler 120 and the rear end of rear connecting link 152 is pivotally connected to dump bed 110.

The effective length of forward connecting link 150 (the distance between the locations where link 150 connects to dump bed 110 and coupler 120) is greater than the effective length of rear connecting link 152 (the distance between the locations where link 152 connects to dump bed 110 and coupler 120). Furthermore, the distance between the locations at which forward connecting link 150 and rear connecting link 152 are connected to coupler 120 is greater than the distance between the locations at which forward connecting link 150 and rear connecting link 152 are connected to dump bed 110.

Figure 3:
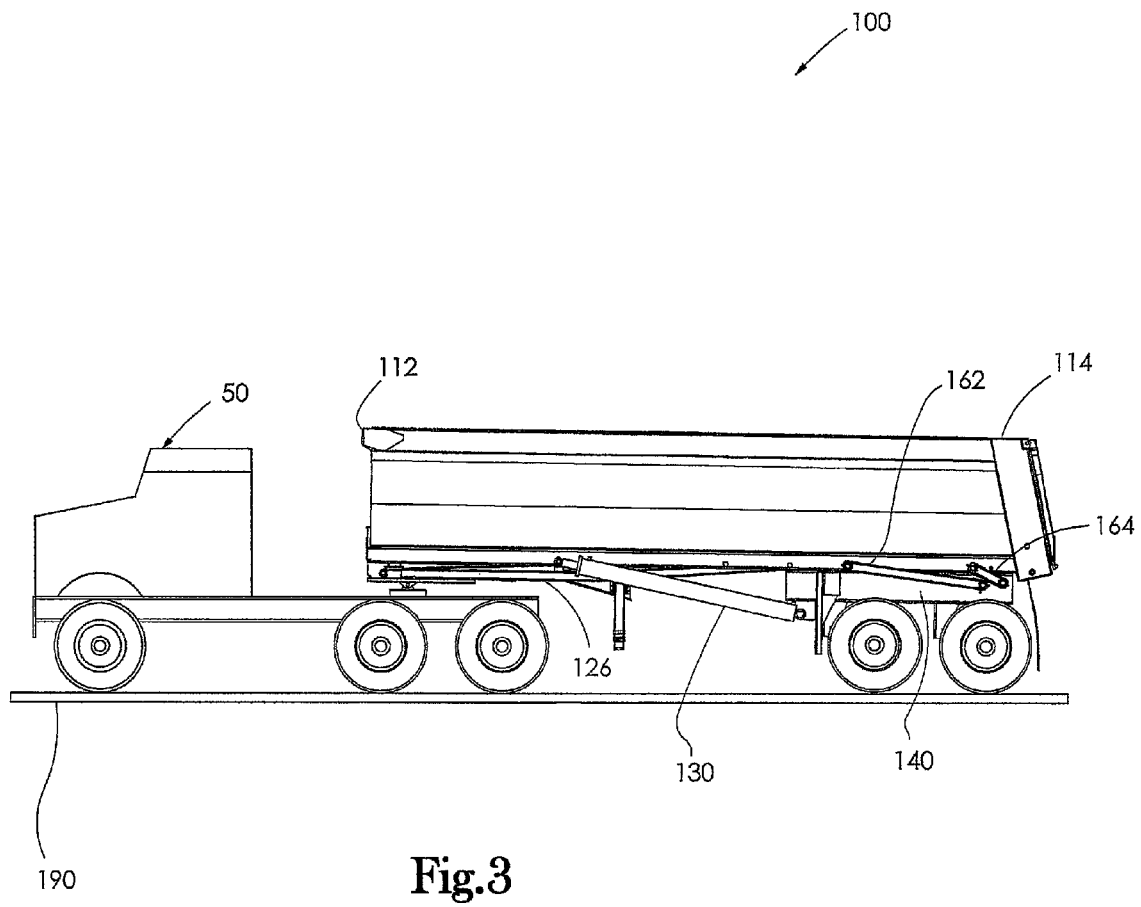
FIG. 3 is a side elevational view of the tractor in FIG. 2 coupled with the dump trailer in FIG. 1 with the dump trailer in the stowed position.
Figure 4:
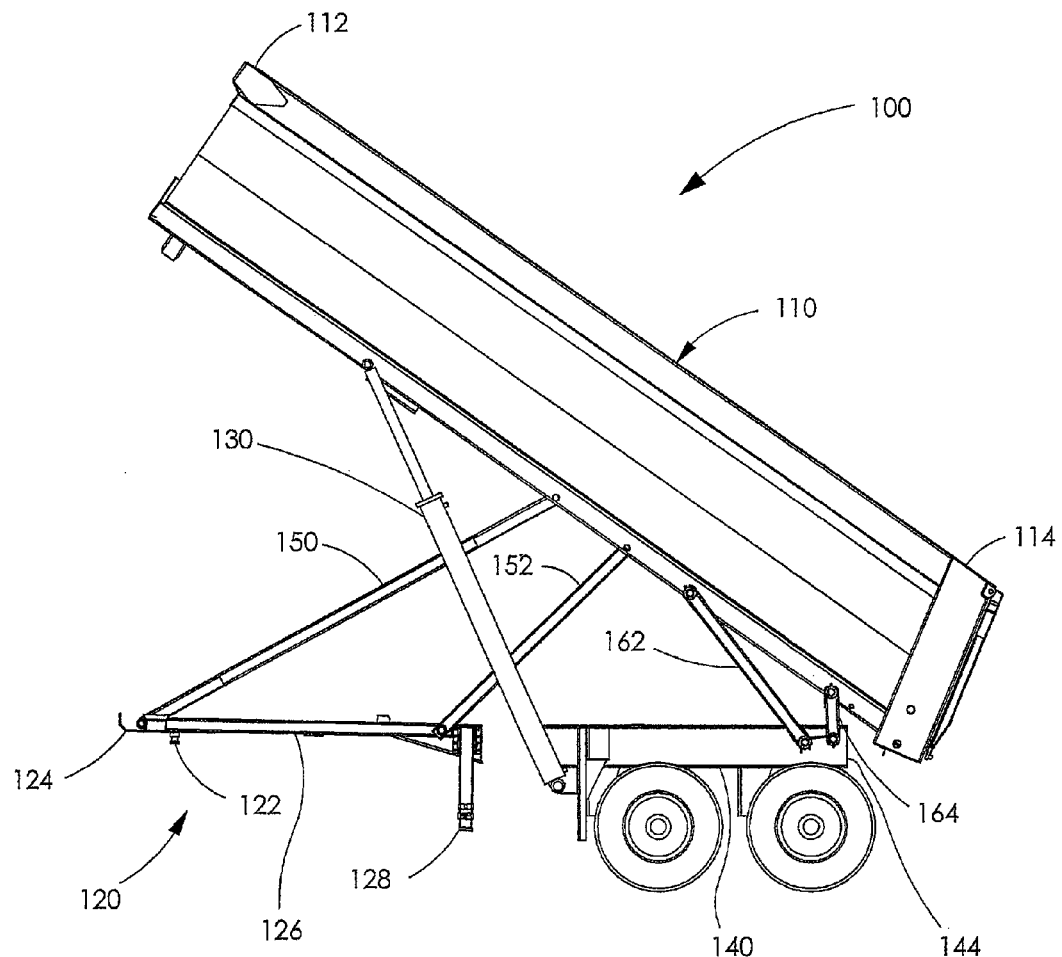
FIG. 4 is a side elevational view of the dump trailer depicted in FIG. 3 in an intermediate raised position.
Figure 5:
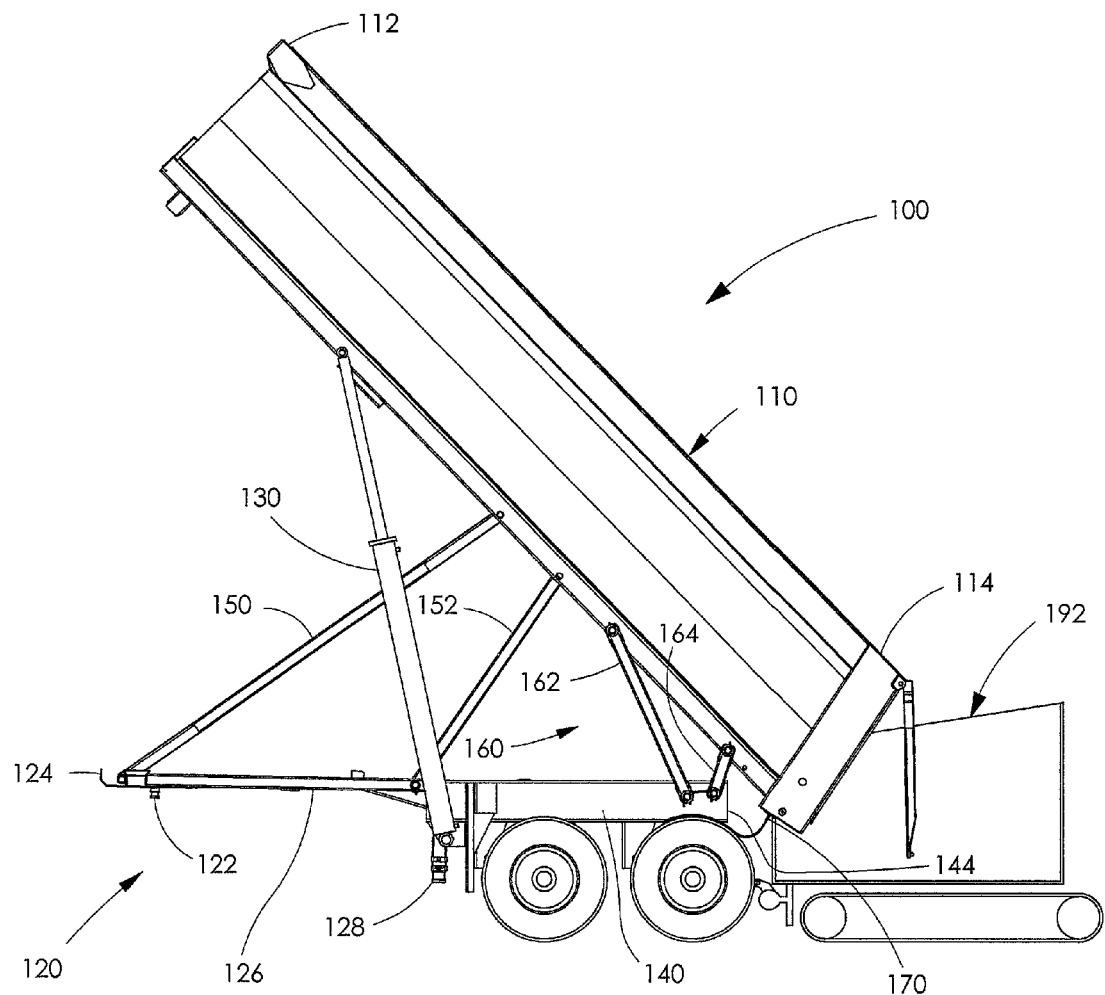
FIG. 5 is a side elevational view of the dump bed depicted in FIG. 1 in the fully-raised position.

When dump bed 110 is in the stowed position with the forward end 112 of dump bed 110 being in its fully-lowered position, forward connecting link 150 and rear connecting link 152 lay substantially flat and are approximately parallel to one another and to the support surface. As the forward end 112 of dump bed 110 is elevated, connecting links 150 rotate (counter-clockwise as depicted in FIGS. 3-5) with the rear ends of forward connecting link 150 and rear connecting link 152 rotating upward. As the rear portions of connecting links 150 and 152 rotate upward, the orientations of the connecting links 150 and 152 transition from being substantially parallel with the dump bed 110 in the stowed position to being substantially non-parallel with the dump bed 110 in the raised position. With dump bed 110 in the fully-raised position, both forward connecting arm or link 150 and rear connecting arm or link 152 extend upward in the rearward direction of dump trailer 100 while simultaneously being nonparallel.

Referring to FIGS. 3-5, a deformable quadrilateral polygon is formed by the stabilizing connecting links 150 and 152, coupler 120 and dump bed 110. In particular, the locations where stabilizing connecting links 150 and 152 pivotally connect to dump bed 110 and coupler 120 form the vertices (corners) of a quadrilateral polygon with fixed length sides that deforms as dump bed 110 rotates. With dump bed 110 in the stowed position, the quadrilateral appears flat with all sides being almost parallel with one another. As the forward end 112 of dump bed 110 rotates upward, the quadrilateral polygon opens and continues to deform as the forward end 112 of dump bed 110 continues to rotate upward. Additionally, as the forward end 112 of dump bed 110 rotates upward in the illustrated embodiment, the sides of the quadrilateral transition from being nearly parallel with one another to being substantially non-parallel. Furthermore, the distance between coupler 120 and the rear support mechanism, for example trailer frame 140, decreases as forward end 112 rotates upward. In other words, trailer frame 140 and trailer wheels 145 move forward toward coupler 120 as forward end 112 of dump bed 110 rotates upward.

As the forward end 112 of dump bed 110 is either raised or lowered, connecting links 150 and 152 hold coupler 120, and in particular pin 122 and coupler plate 124, so that coupler 120 does not tilt. Instead, with coupler 120 being held at a constant height above the support surface by tractor 50, coupler 120 is held steady and in a stationary orientation relative to the support surface and to the tractor, which in the illustrated embodiment is approximately parallel to the support surface. Because of the coupling between coupler plate 124 and coupler 52 on tractor 50, coupler 52 also remains in a stationary orientation and does not tilt. As such, couplers 52 and 120 do not shift during dumping and the need for an additional locking pin is eliminated.

Dump bed 110 is connected to trailer frame 140 and trailer wheels 145 by a lifting device, for example, lift cylinders, and rear hinge mechanism 160. Due to the configuration of dump trailer 100, one or a pair of single-stage hydraulic lift cylinders 130 can be used, which have advantages over multi-stage lift cylinders as discussed above. One end of each lift cylinder 130 is pivotally connected to dump bed 110 and the other end of each lift cylinder 130 is pivotally connected to trailer frame 140. As lift cylinders 130 extend, they exert a force on dump bed 110 that results in the forward end 112 of dump bed 110 rotating upward. Conversely, as lift cylinders 130 contract, the forward end 112 of dump bed 110 rotates downward.

Furthermore, as lift cylinders 130 extend, the force lift cylinders 130 exert on trailer frame 140 includes a component in the rearward direction that tends to force trailer frame 140 in a rearward direction away from coupler 120. However, the stabilizing linkage between dump bed 110 and horizontal member 126 (which includes forward connecting link 150 and rear connecting link 152) causes the trailer frame 140 to move forward toward coupler 120 as the lift cylinders 130 extend.

Lift cylinders 130 are connected at a position that is aft of the forward end 112 of the dump bed 110 and are connected to trailer frame 140 at a position that is relatively close to the support surface. As such, the center of gravity of lift cylinders 130 is lower both in the retracted position (with the forward end 112 of the dump bed 110 lowered) and the extended position (with the forward end 112 of the dump bed 110 raised) than dump trailers where the lift cylinders that either have their upper end attached to the forward end of the dump bed or have their lower end attached to the trailer's coupler. As such, the stability of dump trailer 100 is further enhanced over other designs.

Furthermore, dump trailer 100 eliminates the need to use cylinder wells surrounding the location at which the lift cylinder attaches to the dump bed, which are commonly required with other dump beds. By eliminating the additional structure of a cylinder well, the overall center of gravity is lowered, especially with the dump bed in the raised position.

The rear support mechanism of dump trailer 100, for example, trailer frame 140 supports the rearward end 114 of dump bed 110. Dump bed 110 is connected to trailer frame 140 with a rear hinge mechanism 160. In the illustrated embodiment, rear hinge mechanism 160 includes two hinge arms, for example forward hinge arm 162 and rear hinge arm 164. As the forward end 112 of dump bed 110 rotates upward, the movement of rear hinge mechanism 160 results in dump bed 110 rotating around a point that is spaced a nonzero distance from (i.e., different from) the physical pivoting connections between the hinge mechanism 160, the dump bed 110, and the trailer frame 140. This contrasts with typical hinge mechanisms that connect the dump bed to a single pivot point on the trailer frame, about which the dump bed rotates.

Rear hinge mechanism 160 includes a forward hinge arm 162 and a rear hinge arm 164. Forward hinge arm 162 is longer than rear hinge arm 164. As illustrated, the locations at which hinge arms 162 and 164 pivotally connect to dump bed 110 are separated by a distance greater than the distance that separates the positions at which hinge arms 162 and 164 pivotally connect to trailer frame 140.

In certain embodiments dump bed 110 rotates around a non-stationary pivot point or axis. In other words, the effective pivot location of dump bed 110, which may or may not be located on a rotation axis of a physical hinge, moves with respect to the trailer frame 140 and/or coupler 120 as the forward end 112 of dump bed 110 is rotated upward. (The rotation axis of a physical hinge can also be referred to as a hinge axis). For example, as dump bed 110 rotates, the location at which forward hinge arm 162 connects to dump bed 110 describes a circular path around the location at which forward hinge arm 162 connects to trailer frame 140, the circular path having a radius equal to the effective length of forward hinge arm 162 (the distance between the locations at which the forward hinge arm 162 connects to dump bed 110 and trailer frame 140). Occurring simultaneously as dump bed 110 rotates, the location at which the rear hinge arm 164 connects to dump bed 110 describes a circular arc around the location at which rear hinge arm 164 connects to trailer frame 140, where the radius of the circular arc is equal to the effective length of rear hinge arm 164 (the distance between the locations at which the rear hinge arm 164 connects to dump bed 110 and trailer frame 140). With the locations at which the dump bed 110 connects to forward hinge arm 162 and rear hinge arm 164 moving along non-concentric circular paths of different radii, the dump bed 110 does not rotate around a single point fixed with respect to the trailer frame 140, but rather rotates such that the effective point of rotation moves with respect to the trailer frame 140.

The lower rear edge of dump bed 110, for example dump bed sill 118, also moves upward and rearward, at least initially, as the forward end 112 of dump bed 110 rotates upward. As the forward end 112 of dump bed 110 continues to rotate upward, the dump bed sill 118 begins to move downward as it continues travelling rearward. Also, as the forward end 112 of dump bed 110 rotates upward, the distance between dump bed sill 118 and the back end 114 of trailer frame 140 increases with the dump bed sill 118 extending in a rearward direction with respect to the backend 114 of trailer frame 140.

With dump bed 110 in the stowed position and forward end 112 lowered, the bottom portion of dump bed 110 rests on trailer frame 140 and both forward hinge arm and rear hinge arm 164 angle forward from their respective connection points with trailer frame 140 to their respective connection points with dump bed 110, and forward hinge arm 162 and rear hinge arm 164 are approximately parallel. As lift cylinders 130 extend and rotate forward end 112 of dump bed 110 upward, forward hinge arm 162 and rear hinge arm 164 rotate (clockwise as depicted in FIGS. 3-5), initially lifting the rearward end 114 of dump bed 110 upward and increasing the distance that the rearward end 114 of dump bed 110 extends past the rearward end 114 of trailer frame 140. The upward and rearward extension of the rearward end 114 of dump bed 110 provides a greater separation between trailer wheels 145 and the rearward end 114 of dump bed 110 and allows the use of traditional mud flap brackets 170 and traditional mud flaps 172 without concern of damaging either mud flap bracket 170 or mud flap 172. Additionally, the upward and rearward motion of rear end 114 enhances the ability of rearward end 114 to lift over a sidewall of a hopper 192 without damaging the hopper's sidewall and while allowing the rear end structure of dump trailer to comply with various bumper regulations using uncomplicated structures. For example, mud flaps may be attached using standard angle brackets and uncomplicated bumper designs may be used.

Figure 2:
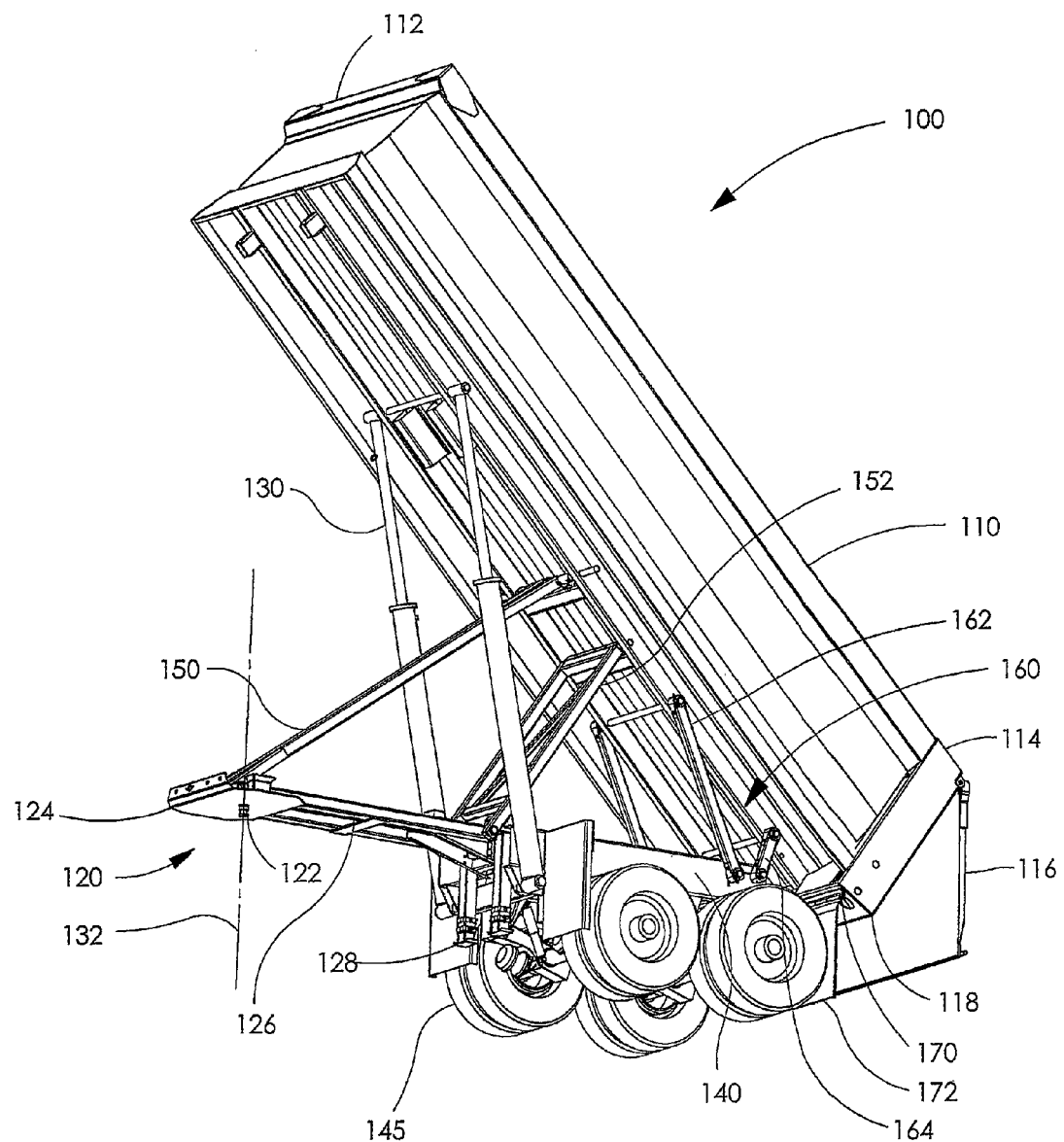
FIG. 2 is a perspective view of a quarter-frame dump trailer according to one embodiment of the present invention.

Although forward hinge arm 162 and rear hinge arm 164 are approximately parallel when dump bed 110 is stowed, forward hinge arm 162 and rear hinge arm 164 rotate to non-parallel orientations as forward end 112 of dump bed 110 rotates upward. Additionally, with dump bed 110 in the fully raised position as depicted in FIGS. 2 and 5, the rear hinge arm 164 can rotate past the vertical and extend upwardly toward the rear of dump trailer 100 while the forward hinge arm 162 still angles upward in the forward direction of trailer 100.

The rear hinge mechanism 160 also forms a deformable quadrilateral with the dump bed 110 and the trailer frame 140. The locations where hinge arms 162 and 164 pivotally connect to dump bed 110 and trailer frame 140 form the vertices (corners) of a quadrilateral that deforms as dump bed 110 rotates. With dump bed 110 in the stowed position, the quadrilateral appears somewhat flattened. As the forward end 112 of dump bed 110 rotates upward, the quadrilateral opens and continues to deform as the forward end 112 of dump bed 110 continues to rotate upward. Additionally, the segment of the quadrilateral located on dump bed 110 (the segment of dump bed 110 between the locations at which the forward hinge arm 162 and the rear hinge arm 164 connect with dump bed 110) is lifted, moved rearward, and rotates with respect to the trailer frame 140 as the dump bed 110 is raised.

It should be appreciated that rear hinge mechanism can be used separately from the forward stabilizing connecting linkage. It should further be appreciated that a simple hinge mechanism with a single pivot point between dump bed 110 and the rear support mechanism can be used in conjunction with the forward stabilizing connecting linkage connecting dump bed 110 and coupler 120.

Figure 6:
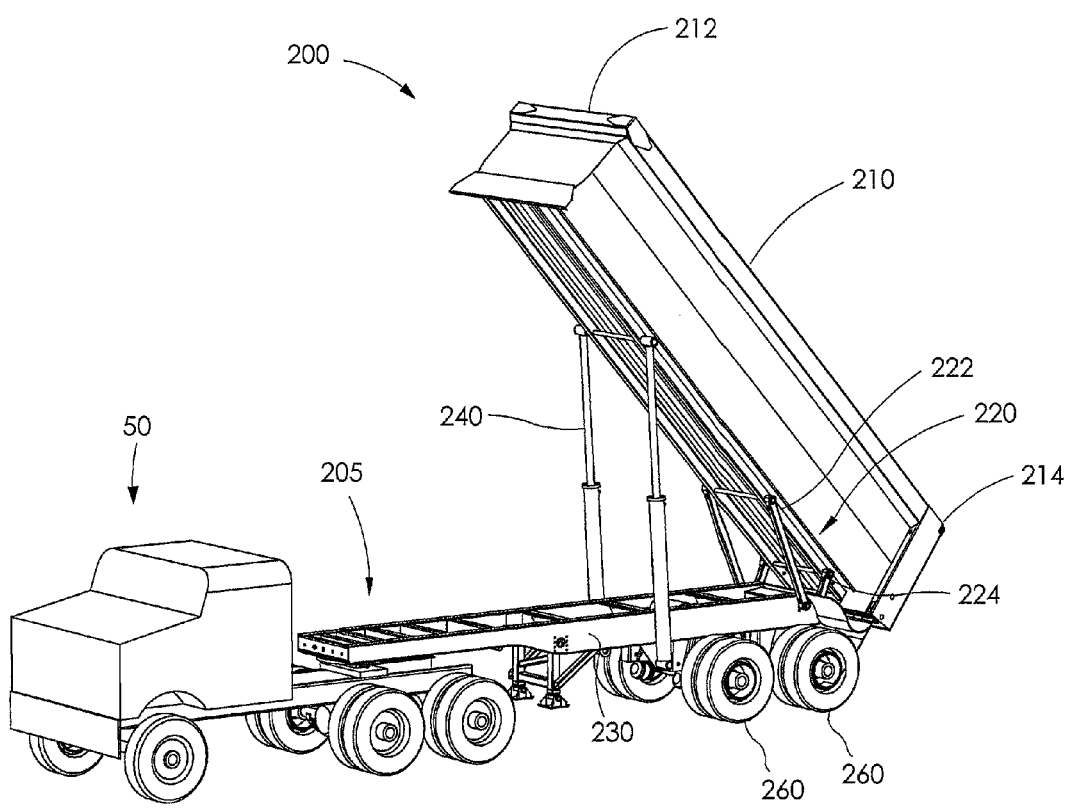
FIG. 6 is a perspective view of a full-frame dump trailer connected to a tractor according to another embodiment of the present invention.
Figure 7:
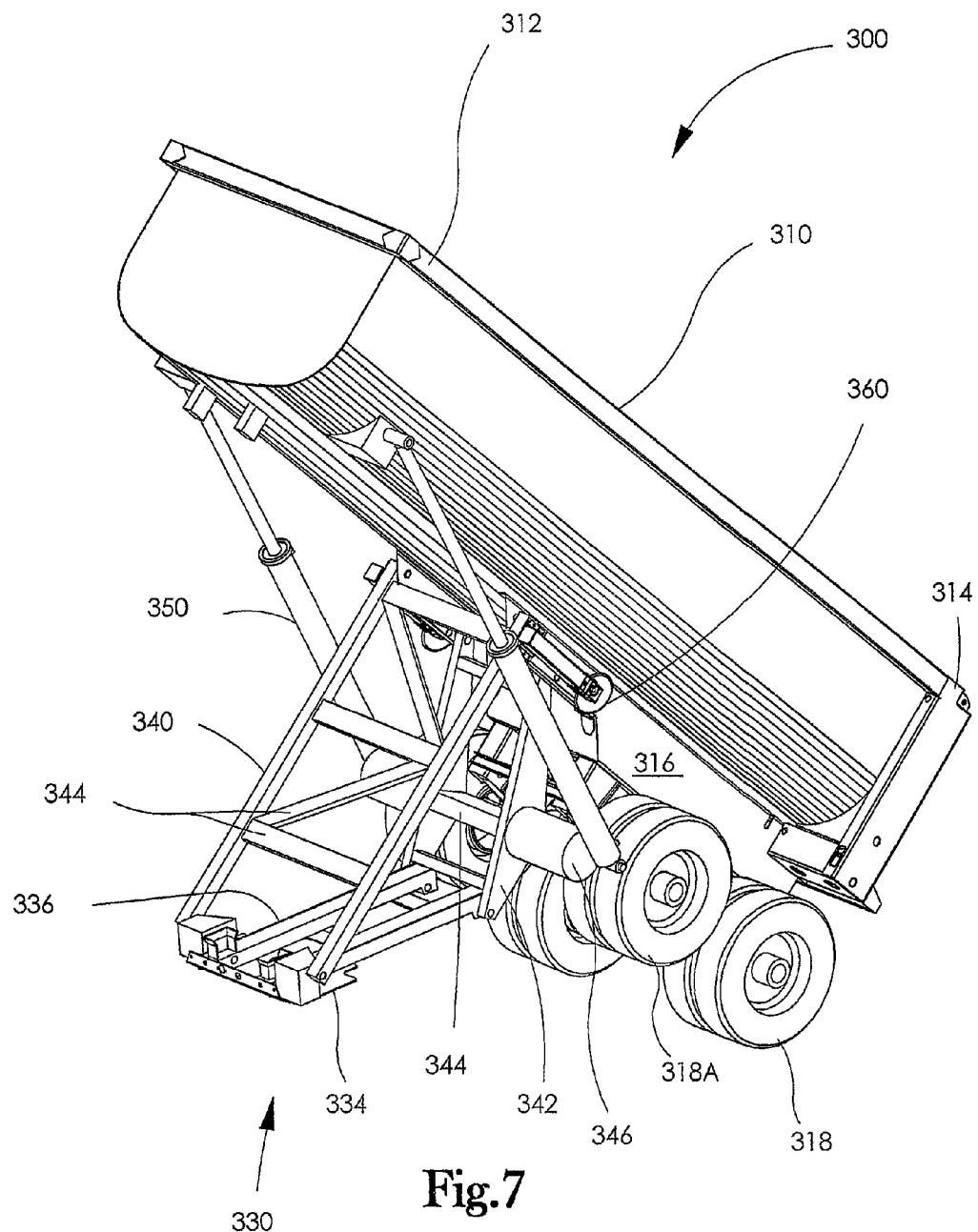
FIG. 7 is a perspective view of a frameless dump trailer according to yet another embodiment of the present invention.
Figure 8:
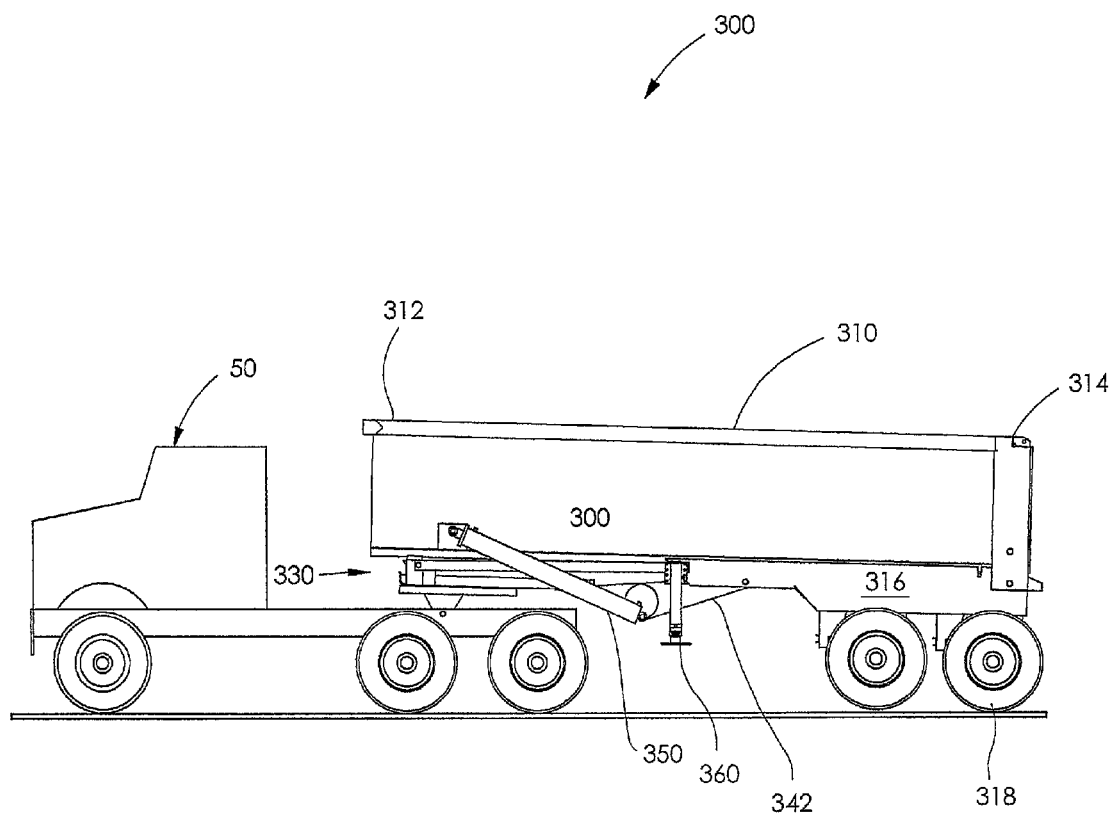
FIG. 8 is a side elevational view of the dump trailer depicted in FIG. 7 in the stowed position and connected to a tractor.
Figure 9:
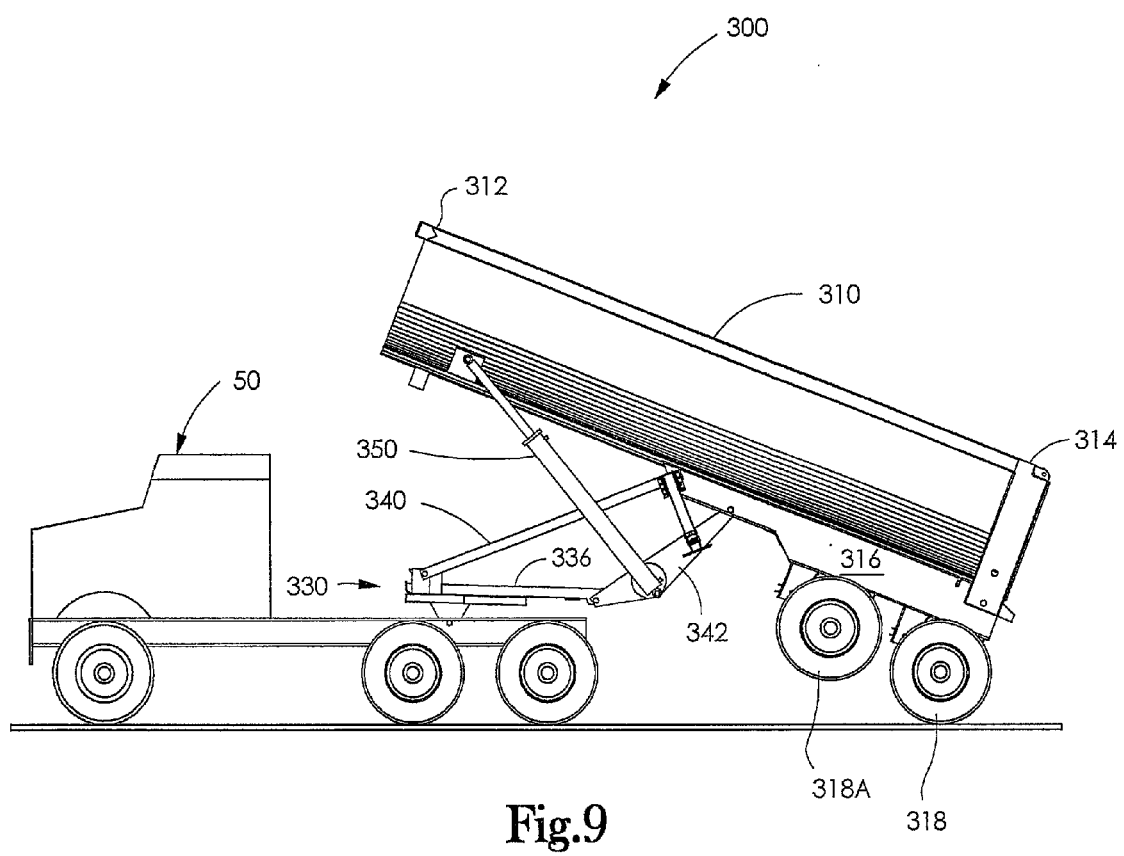
FIG. 9 is a side elevational view of the dump trailer depicted in FIG. 7 in an intermediate raised position.
Figure 10:
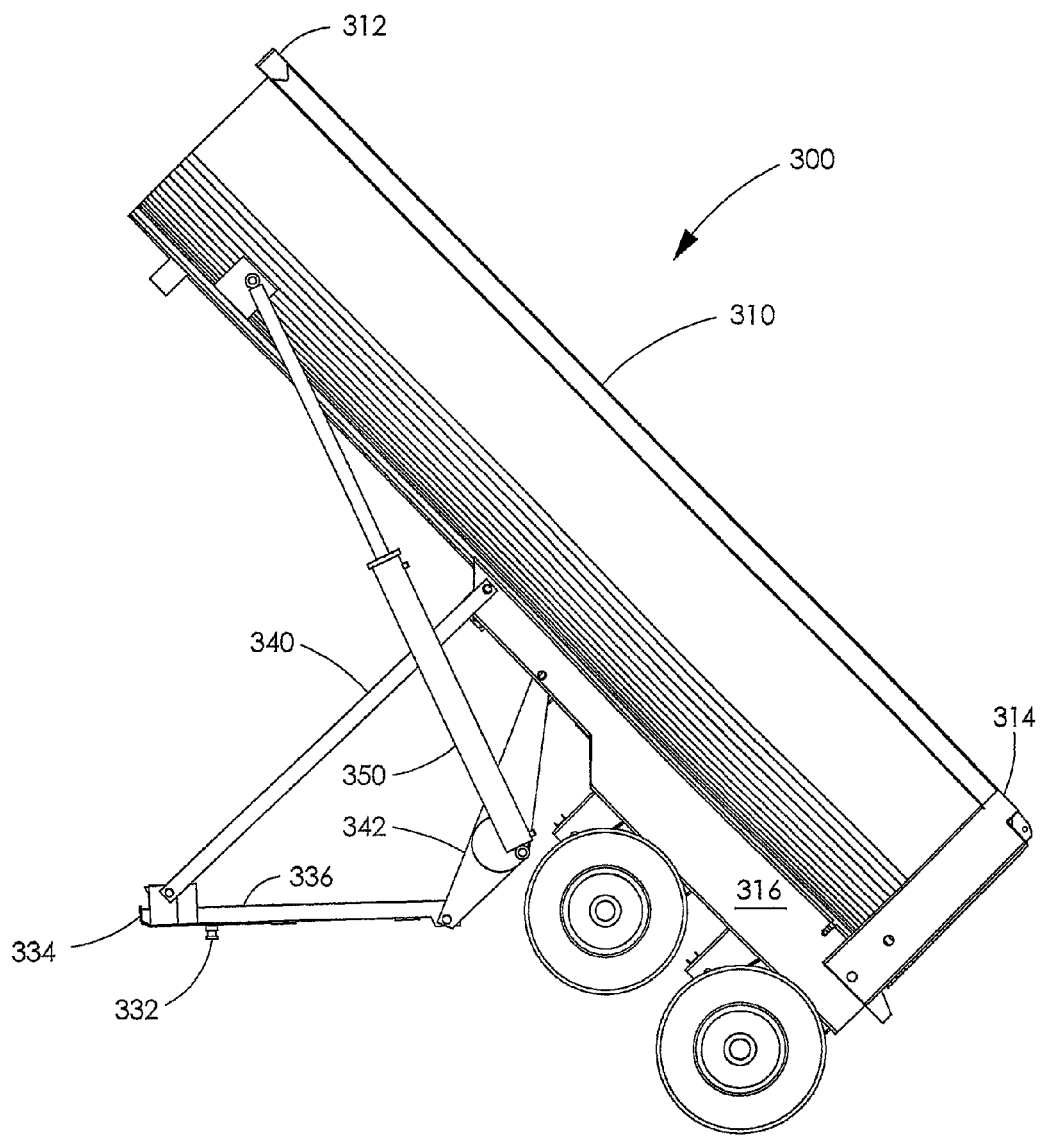
FIG. 10 is a side elevational view of the dump trailer depicted in FIG. 7 in the fully-raised position.

Depicted in FIG. 6 is an alternative embodiment of the present invention depicting a full-frame dump trailer 200. Dump trailer 200 includes a payload carrying member, for example dump bed 210, and a frame 230. A frame 230 that spans the length of the trailer from the coupler 205 to the rear hinge mechanism 220, about which dump bed 210 pivots to empty a payload of material contained within dump bed 210. Coupler 205 includes a pin (not depicted, but similar to pin 122 in FIG. 1) which defines a vertical axis about which the tractor 50 and trailer 200 pivot with respect to one another as the tractor-trailer combination is turned and maneuvered over a roadway.

Lift cylinders 240 connect frame 230 and dump bed 210 and provide the force that raises the forward end 212 of dump bed 210 upward. A rear hinge mechanism 220 further connects the rear end 214 of dump bed 210 to frame 230. Rear hinge mechanism 220 includes a forward hinge arm 222 and a rear hinge arm 224. One end of each hinge arm 222 and 224 is pivotally connected to dump bed 210 while the other end of each hinge arm 222 and 224 is connected to frame 230.

To unload a payload, dump cylinder 240 tilts the forward end 212 of dump bed 210 upward and wheels 260 remain in contact with the ground throughout the dump cycle. Frame 110 also remains horizontal and connected to the tractor. A deformable quadrilateral polygon that deforms as dump bed 210 rotates is formed between the locations at which rear hinge mechanism 220, frame 230 and dump bed 210 connect. Rear hinge mechanism 220 extends the rear sill 214 of dump bed 210 rearward as the forward end 212 of dump bed 210 is rotated upward. The rear hinge mechanism 220 also lifts the rear sill 214 of dump bed 210 upward and rearward as the forward end 212 of dump bed 210 is rotated upward.

Depicted in FIGS. 7-10 is a frameless dump trailer 300 according to another embodiment of the present invention. Frameless dump trailer 300 includes a payload container, for example, dump bed 310, and a coupler 330 for attaching dump trailer 300 to a tractor, such as tractor 50 depicted in FIG. 1.

Dump bed 310 is connected to coupler 330 by stabilizing connecting links or arms 340 and 342, which maintain coupler 330 in a stable rotational orientation with respect to the support surface while dump bed 310 rotates and the tractor holds coupler 330 at a constant height above the support surface. Dump bed 310 includes a forward end 312 that rotates above rear end 314 to unload the contents of dump bed 310 out the rear end 314. Dump bed 310 is non-rotationally connected to wheel frame 316 in that wheel frame 316 rotates along with dump bed 310 as the forward end 312 of dump bed 310 is rotates upward. As such, in embodiments that include forward wheels 318A positioned forward of wheels 318, wheels 318 remain on the support surface and forward wheels 318A are rotated upward off of the support surface as the forward end 312 of dump bed 310 is rotated upward.

Coupler 330 includes a vertically-oriented pin 332, a coupler plate 334, and a horizontal member 336. A forward connecting link 340 pivotally connects to the forward portion of coupler 330 and pivotally connects to dump bed 310. Additionally, a rear connecting link 342 pivotally connects to the rear portion of coupler 330 and pivotally connects to dump bed 310. The position at which forward connecting link 340 connects to dump bed 310 is nearer to the forward end 312 of dump bed 310 than the position at which rear connecting link 342 connects to dump bed 310. Connecting links 340 and 342 optionally include reinforcing members 344 that increase the strength of connecting links 340 and 342.

Lift cylinders 350, which may be hydraulically actuated, have one end pivotally connected to rear connecting link 342 and the other end pivotally connected to dump bed 310, although in alternate embodiments lift cylinders 350 are pivotally connected to coupler 330 instead of rear connecting link 342. An extension 346 is used to connect the lower end of lift cylinder 350 to rear connecting link 342, although in alternate embodiments the locations where left cylinder 350 attaches to dump bed 310 and/or the placement of rear connecting links eliminate for an extension member and lift cylinder 350 is directly connected to rear connecting link 342.

Also connected to forward link 340 are support legs 360 that contact the support surface and are capable of supporting coupler plate 334 when link 340 is in its horizontal orientation so that coupler plate 334 may be disconnected from a tractor.

As seen in FIGS. 7-10, the effective length of forward connecting link 340 (the distance between the locations where link 340 connects to dump bed 310 and coupler 330) is greater than the effective length of rear connecting link 342 (the distance between the locations where link 342 connects to dump bed 310 and coupler 330). Furthermore, the distance separating the locations where forward connecting link 340 and rear connecting link 342 attach to dump bed 310 is less than the distance between the locations at which forward connecting link 340 and rear connecting link 342 connect to coupler 330. As such, the connection points of forward connecting link 340 and rear connecting link 342 to dump bed 310 and horizontal member 336 form a quadrilateral polygon that deforms as bed 310 is raised or lowered. The sides of the quadrilateral are non-parallel and the quadrilateral is open when the forward end 312 of dump bed 310 is raised above rear end 314. However, when forward end 312 of dump bed 310 is in the fully-lowered position, the quadrilateral is collapsed and comparatively flat.

As lift cylinders 350 raise the forward end 312 of dump bed 310 upward, coupler 330 inherently remains in a stationary orientation, which is roughly parallel to the support surface. As such, coupler 330 and the tractor coupler to which it is connected do not tilt, which minimizes unintentional movement of dump bed 310, enhances the inherent stability of dump bed 300 over other dump trailers, and eliminates the requirement for the operator to lock, such as by inserting a pin in the tractor coupler.

Furthermore, the configuration of frameless dump trailer 300 permits use of single-stage hydraulic lift cylinders, which avoids additional instabilities that can be introduced when using multi-stage hydraulic cylinders to raise the forward end 312 of dump bed 310. Still further, although the overall mass of coupler 330, forward connecting length 340 and rear connecting link 342 may increase the overall weight of dump trailer 300 when compared to other frameless dump trailer designs, the location of the additional mass beneath the dump bed 310 serves to lower the overall center of gravity of frameless dump trailer 300 and increase the stability of dump trailer 300 in both the stowed and extended positions.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Dimensions, whether used explicitly or implicitly, are not intended to be limiting and may be altered as would be understood by one of ordinary skill in the art. Exemplary embodiments have been shown and described, and all changes and modifications that come within the spirit of the invention are desired to be protected.

What is claimed is:

1. A dump trailer adapted to couple with a tractor, the tractor including a coupler, the dump trailer comprising:
a dump bed with a forward end and a rearward end;
a trailer coupler adapted to couple with a tractor coupler;
a first link arm pivotally connected to the dump bed and pivotally connected to the trailer coupler; and
a second link arm pivotally connected to the dump bed and pivotally connected to the trailer coupler;
wherein the locations at which the first and second link arms connect to the dump bed and the locations at which the first and second link arms connect to the trailer coupler form the vertices of a quadrilateral polygon with fixed length sides that deforms as the forward end of the dump bed is raised.

2. The dump trailer of claim 1, wherein the first link arm, the second link arm and the trailer coupler are adapted to maintain the trailer coupler in a stationary orientation with respect to a support surface as the forward end of the dump bed is raised.

3. The dump trailer of claim 1,
wherein the distance between the locations at which the first link arm attaches to the dump bed and the trailer coupler is greater than the distance between the locations at which the second link arm attaches to the dump bed and the trailer coupler; and
wherein the distance between the locations at which the first link arm and the second link arm attach to the trailer coupler is greater than the distance between the locations at which the first link arm and second link arm attach to the dump bed.

4. The dump trailer of claim 1, comprising:
a rear support adapted to support the rearward end of the dump bed above a support surface; and
a rear hinge mechanism connected to the dump bed at an upper connection location and connected to the rear support at a lower connection location, wherein the dump bed rotates about a pivot location different from the upper and lower connection locations as the forward end is raised relative to the rearward end.

5. The dump trailer of claim 1, wherein the effective point of rotation of the dump bed moves relative to the trailer coupler as the forward end is raised relative to the rearward end.

6. A dump trailer of claim 1, comprising:
a rear support assembly adapted to support the rearward end of the dump bed above a support surface; and
an expandable lift cylinder connected to the rear support assembly and connected to the dump bed at a point forward of the locations at which the first and second link arms are connected to the dump bed, wherein expansion of the lift cylinder raises the forward end of the dump bed relative to the support surface and moves the rear support assembly forward toward the trailer coupler.

7. A dumping vehicle, comprising:
a dump bed with a lifting end adapted to be raised relative to a dumping end;
a rear support adapted to support the dumping end of the dump bed above a support surface; and
a rear hinge mechanism connected to the dump bed at an upper connection location adjacent the rear end of said dump bed and connected to the rear support at a lower connection location, wherein the dump bed rotates about a pivot location different from the upper and lower connection locations as the lifting end is raised relative to the dumping end.

8. The dumping vehicle of claim 7, wherein the effective point of rotation for the dump bed moves relative to said rear support as the lifting end is raised relative to the dumping end.

9. The dumping vehicle of claim 7, wherein the rear hinge mechanism includes two hinge arms, a first hinge arm pivotally connected to the dump bed and pivotally connected to the rear support and a second hinge arm pivotally connected to the dump bed and pivotally connected to the rear support.

10. The dumping vehicle of claim 9, wherein the locations at which the first and second hinge arms pivotally connect to the dump bed and the rear support form the vertices of a quadrilateral polygon with fixed length sides, and wherein the polygon deforms as the lifting end of the dump bed is raised relative to the dumping end of the dump bed.

11. The dumping vehicle of claim 9,
wherein the effective length of the first hinge arm is different than the effective length of the second hinge arm; and
wherein the distance between the locations at which the first and second hinge arms pivotally connect to the dump bed is different than the distance between the locations at which the first and second hinge arms pivotally connect to the rear support.

12. A method for tilting a dump trailer dump bed, the method comprising the acts of:
providing a dump trailer with a dump bed and a trailer coupler adapted to couple with a tractor coupler, the dump bed and trailer coupler being connected by two stabilizing link arms, the locations at which the two stabilizing link arms connect to the dump bed and to the trailer coupler forming a quadrilateral polygon with fixed length sides;
raising the lifting end of the dump bed relative to the dumping end of the dump bed; and
deforming the quadrilateral polygon during said raising.

13. The method of claim 12, wherein the trailer coupler remains in a stable orientation with respect to a support surface supporting the dump trailer during said raising.

14. A method, comprising the acts of:
supporting a dumping end of a dump trailer dump bed with a rear support;
pivotally connecting the dump bed and the rear support with a rear hinge mechanism, the rear hinge mechanism being pivotally connected to the dump bed and pivotally connected to the rear support;
raising the lifting end of the dump bed relative to the dumping end;
rotating the dump bed around a pivot point spaced a non-zero distance from the locations where the rear hinge mechanism is pivotally connected to the dump bed and the rear support.

15. The method of claim 14, wherein the rear hinge mechanism includes two hinge arms, each hinge arm being pivotally connected to the dump bed and pivotally connected to the rear support, and wherein the locations at which the hinge arms pivotally connect to the dump bed and the rear support form the vertices of a quadrilateral polygon with fixed length sides, the method comprising:

deforming the quadrilateral polygon during said raising.

16. The method of claim 14, comprising:

connecting the dump bed to a dump trailer coupler with two stabilizing link arms, wherein the locations at which the two stabilizing link arms connect to the dump bed and to the coupler form the vertices of a quadrilateral polygon with fixed length sides;

raising the lifting end of the dump bed relative to the dumping end of the dump bed; and deforming the quadrilateral polygon during said raising.

* * * * *